(12) United States Patent
Hulten et al.

(10) Patent No.: US 8,001,582 B2
(45) Date of Patent: Aug. 16, 2011

(54) CROSS-NETWORK REPUTATION FOR ONLINE SERVICES

(75) Inventors: Geoffrey John Hulten, Lynnwood, WA (US); Kristofer Noel Iverson, Redmond, WA (US); Wei-Quiang Michael Guo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 12/016,336

(22) Filed: Jan. 18, 2008

(65) Prior Publication Data
US 2009/0187988 A1 Jul. 23, 2009

(51) Int. Cl.
*G06F 7/04* (2006.01)
(52) U.S. Cl. .......................................................... 726/3
(58) Field of Classification Search ................... None
See application file for complete search history.

(56) References Cited

U.S. PATENT DOCUMENTS

| | | | |
|---|---|---|---|
| 5,903,721 A * | 5/1999 | Sixtus | 726/2 |
| 6,892,179 B1 * | 5/2005 | Zacharia | 705/10 |
| 7,206,814 B2 | 4/2007 | Kirsch | |
| 7,401,235 B2 * | 7/2008 | Mowers et al. | 726/2 |
| 7,444,518 B1 * | 10/2008 | Dharmarajan et al. | 713/185 |
| 7,639,672 B2 * | 12/2009 | Foote | 370/352 |
| 7,711,684 B2 * | 5/2010 | Sundaresan et al. | 707/781 |
| 2003/0217288 A1 * | 11/2003 | Guo et al. | 713/201 |
| 2004/0003283 A1 * | 1/2004 | Goodman et al. | 713/201 |
| 2004/0098616 A1 | 5/2004 | Jenner et al. | |
| 2004/0199770 A1 * | 10/2004 | Roskind | 713/176 |
| 2004/0225878 A1 | 11/2004 | Costa-Requena et al. | |
| 2004/0230527 A1 * | 11/2004 | Hansen et al. | 705/40 |
| 2005/0044156 A1 * | 2/2005 | Kaminski et al. | 709/206 |
| 2005/0080857 A1 | 4/2005 | Kirsch et al. | |
| 2005/0097320 A1 * | 5/2005 | Golan et al. | 713/166 |
| 2005/0201363 A1 | 9/2005 | Gilchrist et al. | |
| 2005/0235341 A1 | 10/2005 | Stieglitz et al. | |
| 2005/0262209 A1 | 11/2005 | Yu | |
| 2006/0168024 A1 * | 7/2006 | Mehr et al. | 709/206 |
| 2006/0179113 A1 | 8/2006 | Buckingham et al. | |
| 2006/0212925 A1 * | 9/2006 | Shull et al. | 726/1 |
| 2006/0253584 A1 | 11/2006 | Dixon et al. | |
| 2006/0277259 A1 * | 12/2006 | Murphy et al. | 709/206 |
| 2007/0027992 A1 * | 2/2007 | Judge et al. | 709/227 |
| 2007/0078675 A1 | 4/2007 | Kaplan | |
| 2007/0086592 A1 * | 4/2007 | Ellison et al. | 380/282 |
| 2007/0130349 A1 | 6/2007 | Wong | |

(Continued)

OTHER PUBLICATIONS

Lee (Lee et al. "An adaptive Authentidcation Protocol based on Reputation for Peer-to-Peer System", 2003 Symposium on Cryptography and Information Security, Jan. 26-29, 2003).*

(Continued)

*Primary Examiner* — Peter Poltorak
(74) *Attorney, Agent, or Firm* — Senniger Powers LLP

(57) ABSTRACT

A reputation server associates feedback from previous network transactions with an account of a user in a network. A reputation score for the user is calculated based on the feedback to indicate the probability the user will abuse the network. When an online service receives a request to perform a transaction from the user, the online service performs the transaction based on the user's reputation score. Additionally, a server generates a reputation packet including the reputation score for a user for use by an online service when the user requests the online service to perform a transaction. The online service may authenticate the reputation packet with the server and, if the reputation packet is authenticated, the online service performs the transaction based on the user's reputation score.

15 Claims, 3 Drawing Sheets

U.S. PATENT DOCUMENTS

| | | | |
|---|---|---|---|
| 2007/0130350 A1* | 6/2007 | Alperovitch et al. | 709/229 |
| 2007/0162349 A1* | 7/2007 | Silver | 705/26 |
| 2007/0208817 A1 | 9/2007 | Lund et al. | |
| 2007/0214151 A1* | 9/2007 | Thomas et al. | 707/10 |
| 2007/0250919 A1* | 10/2007 | Shull et al. | 726/7 |
| 2008/0080711 A1 | 4/2008 | Gagnon et al. | |
| 2008/0141366 A1* | 6/2008 | Cross et al. | 726/21 |
| 2008/0256364 A1 | 10/2008 | Chang et al. | |
| 2009/0113209 A1* | 4/2009 | Lee et al. | 713/186 |

OTHER PUBLICATIONS

Windely (Windley et al., "Using Reputation to Augment Explicit Authorization", DIM '07: Proceedings of the 2007 ACM workshop on Digital identity management (2007), pp. 72-81).*

Kormann (Kormann et al. "Risks of the Passport single signon protocol", Computer Networks 33, p. 51-58, 2000).*

Unknown, "Email's Not What It Used to Be: Reputation Matters More Than Ever," printed from http://www.habeas.com/fileadmin/resources/Whitepapers/Habeas_Email_Isnt_What_It-Used_to-Be_WP.pdf, 5 pages, US.

Unknown, IronPort Reputation Filters, printed from http://wwww.ironport.com/products/reputation_filters.html, 3 pages, US.

Taylor, "Sender Reputation in a Large Webmail Service," Third Conference on Email and Anti-Spam, printed from http://www.ceas.cc/2006/19.pdf, Jul. 2006, 6 pages, Google, Inc., US.

Chew et al, "Baffle Text: a Human Interactive Proof," Proceedings of the SPIE/IS&T Document Recognition & Retrieval Conf. X, Jan. 2003, 11 pages, CA, US.

Coates et al., "Pessimal Print: A Reverse Turing Test," IEEE 2001, pp. 1154-1158, US.

Baird et al., "Human Interactive Proofs and Document Image Analysis," Springer-Verlag Berlin Heidelberg 2002, DAS 2002, LNCS 2423, pp. 507-518, Germany.

* cited by examiner

US 8,001,582 B2

CROSS-NETWORK REPUTATION FOR ONLINE SERVICES

BACKGROUND

Online services allow users to perform a variety of transactions. And, while SPAM filters, antivirus software, and other techniques are used to protect members of the online services, some undesirable transactions are allowed and some desirable transactions are blocked (false positives). Furthermore, false positives occur more often with infrequent or new users because they are not known to the online services.

A number of technologies are used to reduce the damage of false positives including accreditation of large senders and the use of computational or human interactive proofs for smaller senders. Unfortunately, these technologies can be onerous or insufficient, especially for infrequent or new users.

SUMMARY

Embodiments of the invention overcome one or more vulnerabilities associated with false positives for users of online services of a network, especially new or infrequent users. Aspects of the invention associate reputation feedback with an account of a user in a network. The reputation feedback is based on the previous network transactions of the user. A reputation score for the user is calculated based on the reputation feedback to indicate the probability the user will abuse the network. When an online service receives a request to perform a transaction from the user, the online service performs the transaction based on the user's reputation score.

Other aspects of the invention include generating a reputation packet including the reputation score for a user. The reputation packet is provided to an online service when the user requests the online service to perform a transaction. The online service may authenticate the reputation packet with a reputation server. If the reputation packet is authenticated, the online service performs the transaction based on the user's reputation score.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
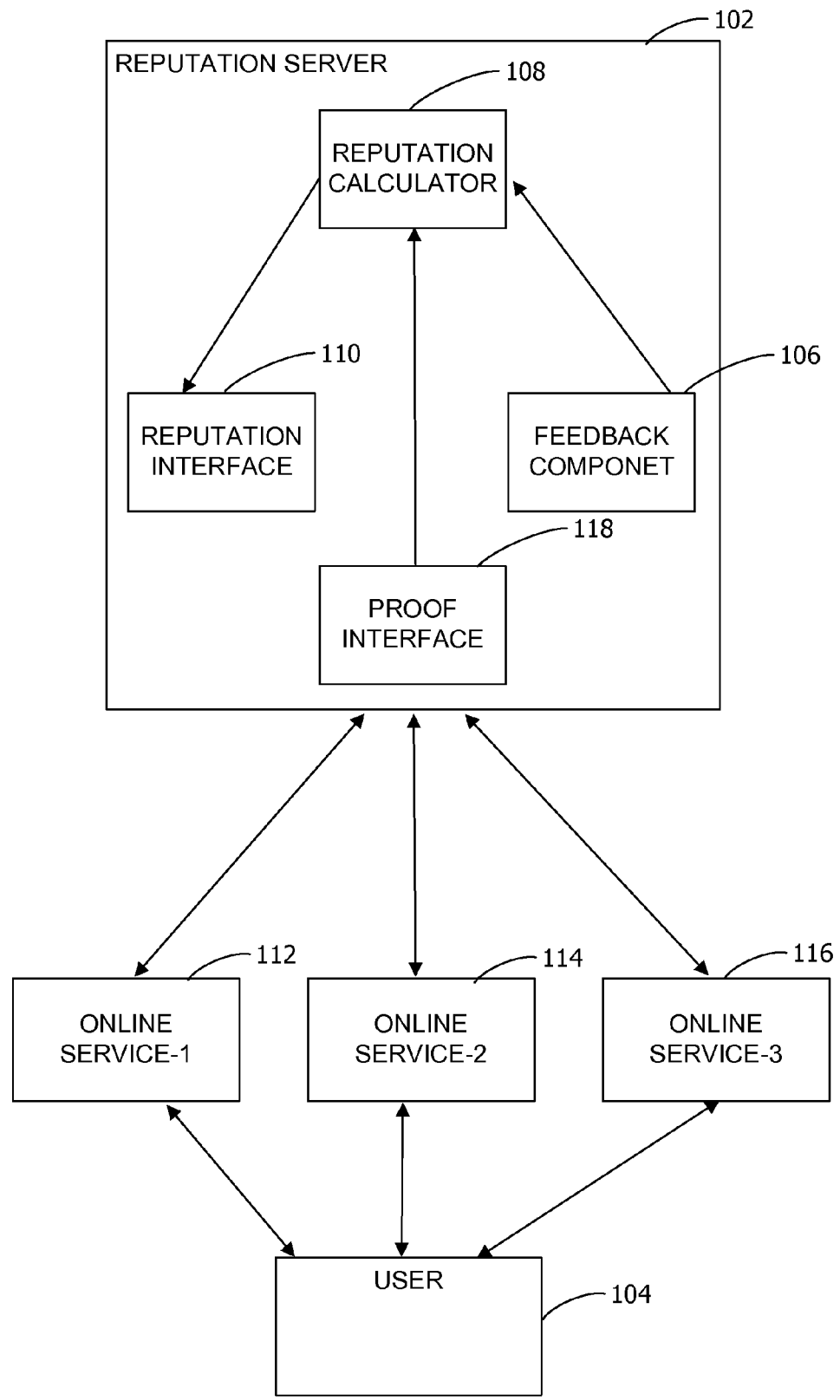
FIG. 1 is a block diagram illustrating one example of a suitable computing system environment in which the invention may be implemented

Referring now to the drawings, aspects of the invention implement a reputation server for providing a reputation score associated with a user of online services on a network.

The user may perform a variety of transactions through these online services, including sending an email, sending and receiving instant messages, and sharing photos or video. Abuse of such networks is common place (e.g., SPAM, viruses, spybots) and, consequently, the ability to predict an abuse of the network is critical to the user experience.

FIG. 1 is a block diagram illustrating one example of a suitable computing system environment in which the invention may be implemented. The system includes a reputation server 102 for calculating a reputation score of a user 104 of a network including a feedback component 106, a reputation calculator 108, and a reputation interface 110. The network includes one or more online services (e.g., online service-1 112, online service-2 114, online service-3 116). For example, the online services may include one or more of the following: a social networking service, an email service, a chat service, and an instant message service.

The feedback component 106 receives reputation feedback regarding one or more transactions by the user 104 with at least one of the online services 112. For example, the past and present transactions may include one or more of the following: sending an email, sending an instant message, sending message in a chat room, posting a message to a blog, posting audio to a blog, posting video to a blog, and posting a comment on a blog. The feedback indicates whether any of the user's transactions with the online services (e.g., online service-1 112, online service-2 114, online service-3 116) constitutes a misuse of the network (e.g., a phishing attack).

Advantageously, the reputation feedback may be collected across a plurality of online services (e.g., online service-1 112, online service-2 114, online service-3 116) to allow the user 104 to develop a network-wide reputation as a non-abuser and then leveraging this reputation to protect the user 104 from false positives on the network. For example, a user 104 who posts many valuable messages to a popular message board should be able to send a personal e-mail message from an email account to another email user on the network without having it deleted as a false positive. This idea can also span across networks through partnerships or via enabled clients to allow good citizens of one network to communicate with members of the other networks and interact with other networks without the risk of a false positive. For example, the user who posts many valuable messages to a popular message board should also be trusted to upload photos to an external photo sharing web space.

The reputation calculator 108 calculates the reputation score of the user 104 based on the reputation feedback. The reputation score indicates a probability that a subsequent transaction by the user 104 is a misuse of the network.

The reputation interface 110 receives requests from one or more of the online services (e.g., online service-1 112, online service-2 114, online service-3 116) for the reputation score of the user 104 and sends the reputation score of the user 104 to the requesting online service.

In an alternative embodiment, the reputation server 102 also includes a proof interface 118 for requesting the user 104 to perform a proof when the user's reputation score is not sufficient to grant the user's request. The proof interface 118 receives the requested proof from the user 104 and sends the requested proof to the online service (e.g., online service-1 112, online service-2 114, online service-3 116). The online service (e.g., online service-1 112, online service-2 114, online service-3 116) grants the user's request in response received proof. The proof may include both computational and human interactive proof. A computational proof requires the user 104 to solve a computational proof and the presence of a valid, solved computational proof in a transaction indicates the user 104 is not abusing the network. And a human interactive proof is a challenge which is meant to be easily solvable by humans but too hard to be economically solved by computers. Those skilled in the art are familiar with various computational and human interactive proofs suitable for embodiments of the invention.

Additionally, the online service (e.g., online service-1 112, online service-2 114, online service-3 116) may provide reputation feedback to the feedback component 106 based on the received proof. In response to receiving the reputation feedback, the reputation calculator 108 adjusts the user's reputation score based on the reputation feedback provided by the online service (e.g., online service-1 112, online service-2 114, online service-3 116).

Figure 2:
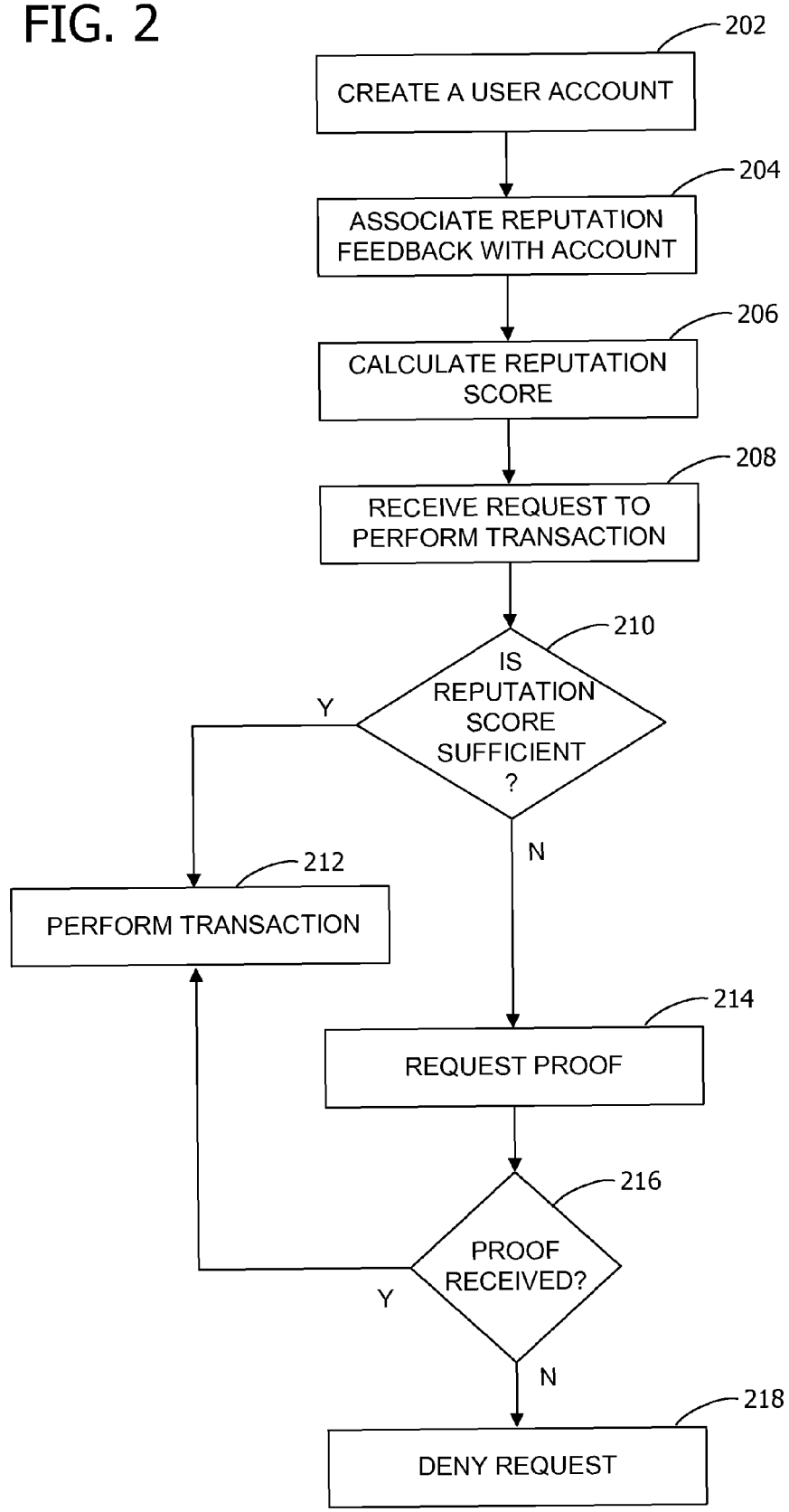
FIG. 2 is an exemplary flow diagram illustrating a method for a method for authenticating a user based on a network-wide reputation for the user.

FIG. 2 is an exemplary flow diagram illustrating a method for authenticating a user 104 based on a network-wide reputation for the user 104. At 202, a user account is created for accessing one or more online services (e.g., online service-1 112, online service-2 114, online service-3 116) of the network. For example, the online services include one or more of the following: a social networking service, an email service, a chat service, a photo sharing service, a file storage and sharing service, a shopping service, a search service, a map viewing service, and an instant message service.

At 204, reputation feedback is associated with the user account. The reputation feedback is based on one or more past transactions between the user 104 and at least one of the online services (e.g., online service-1 112, online service-2 114, online service-3 116) of the network. For example, the past and present transactions include one or more of the following: sending an email, sending an instant message, sending message in a chat room, saving a file, accessing a file, purchasing a product or service from a shopping service, searching the Internet, searching a web space, searching for directions, searching for an address, posting a message to a blog, posting audio to a blog, posting video to a blog, and positing a comment on a blog. The reputation feedback indicates whether or not any of the past transactions constitutes a misuse of the network (e.g., a virus).

At 206, the reputation server 102 calculates a reputation score for the user 104 based on the reputation feedback associated with the user account for the past transactions. The reputation score indicates a likelihood of misuse of the network by the user 104. For example, the user's reputation score is negatively impacted when at least one of the past transactions includes one or more of the following: SPAM, spyware, a virus, copyrighted material, a phishing attack, content prohibited by a user agreement, pornography, and other content an administrator of the network determines to be malicious and/or undesirable.

The calculated reputation score indicates the acceptable likelihood for granting the user's request to perform the present transaction differs as a function of one or more of the following: a type of transaction, a type of online service (e.g., online service-1 112, online service-2 114, online service-3 116), a time of the request, and a number of past transactions. For example, a new user 104 may not be allowed to send a single email message to hundreds of recipients. However, the user 104 who has performed thousands of transaction without receiving negative reputation feedback may be allowed to send such an email message.

Specifically, the user's reputation score may be calculated based on one or more of the following reputation feedback metrics: a number of times the user 104 has completed a transaction with the one or more online services, a number of other network users who have interacted with content generated by the user 104; a number of transactions the user 104 has performed involving other network users, a number of complaints the user 104 has received from other network users of the one or more online services, a number of times the user's content has been viewed by a network moderator or other highly trusted network user, a number of times the user 104 had content removed because of an abuse report, a number of days since the user's user account was created, a number of unique days the user 104 has been active on the network, an amount of traffic over the past 24 hours divided by the amount of traffic generated by user 104 in an average 24 hour period, an amount of money the user 104 has spent in the network, an amount of proof the user 104 has provided, and a safety status of a client machine the user 104 uses to access the network. Additionally, weights may be assigned to these metrics to determine the probability that the metric indicates the user is going to abuse the system. A number of techniques may be used to calculate the weights including decision trees, neural network logistic regression, and other machine learning algorithms which analyze past transactions of users to determine when an abuse is likely to occur.

For example, a training set can be built on historical user interaction data by observing users previous transactions (say from last month), the values of these indicated statistics at the time of the transaction, and the eventual result of that transaction (for example a transaction that receives a complaint could be assigned a "1" and one that does not could be assigned a "0"). The statistics are converted into features for a machine learning algorithm using standard techniques and the learning algorithm is applied to the resulting training set. Then when a new transaction request arrives, the statistics related to the user making the request are gathered and the machine learning model is consulted. If the model has a sufficiently confident prediction of 1 (that based on the provided statistics the transaction is likely to result in a complaint) then the transaction is flagged as requiring additional proof.

Alternatively, the reputation server 102 calculates the reputation score for the user 104 based on reputation feedback received from a trusted service which does not belong to the network.

At 208, a request is received from the user 104 to perform a present transaction with at least one of the online services (e.g., online service-1 112, online service-2 114, online service-3 116) of the network.

If the user's reputation score is sufficient to grant the user's request to perform the present transaction at 210, the online service (e.g., online service-1 112, online service-2 114, online service-3 116) grants the user's request to perform the present transaction at 212. In this case, the calculated reputation score for the user 104 indicates an acceptable likelihood that the present transaction will not constitute a misuse of the network. Alternatively, the request is granted access based on the reputation score of the user 104 and the likelihood that the present transaction is not an abuse of the network.

And, at 210, if the user's reputation score is not sufficient to grant the user's request to perform the present transaction, the reputation server 102 requests the user 104 perform a proof at 214. If the user 104 provides the proof at 216, the reputation server 104, grants the user's request to perform the present transaction at 212. If not, the reputation server 104 denies the user's request to perform the present transaction at 218.

Additionally, the reputation server 102 may adjust the user's reputation score based on the requested proof. For example, if the user 104 provides the requested proof, the user's reputation score may be positively impacted and if the user 104 does not provided the requested proof the user's reputation may be negatively impacted.

In another embodiment, the reputation server 102 generates a reputation packet in response to the user's request to perform the present transaction. The reputation packet includes the user's reputation score. Additionally, the reputation packet may include one or more of the following: an identity of the user 104, a timestamp indicating the lifetime of the reputation packet, a suggested proof needed to grant the request, and information needed for the online service (e.g., online service-1 112, online service-2 114, online service-3 116) to provide reputation feedback regarding the user's present transaction.

The request and the reputation packet are forwarded to the online service (e.g., online service-1 112, online service-2 114, online service-3 116) associated with the request. And the online service grants the request of the user 104 based on the reputation packet.

Alternatively, the reputation packet may be included in a request from the user 104 to perform a transaction with an external service. The external service is an online service outside the network. The external service receives the reputation packet and grants or denies the request based at least in part on the user's reputation score included in the reputation packet.

Figure 3:
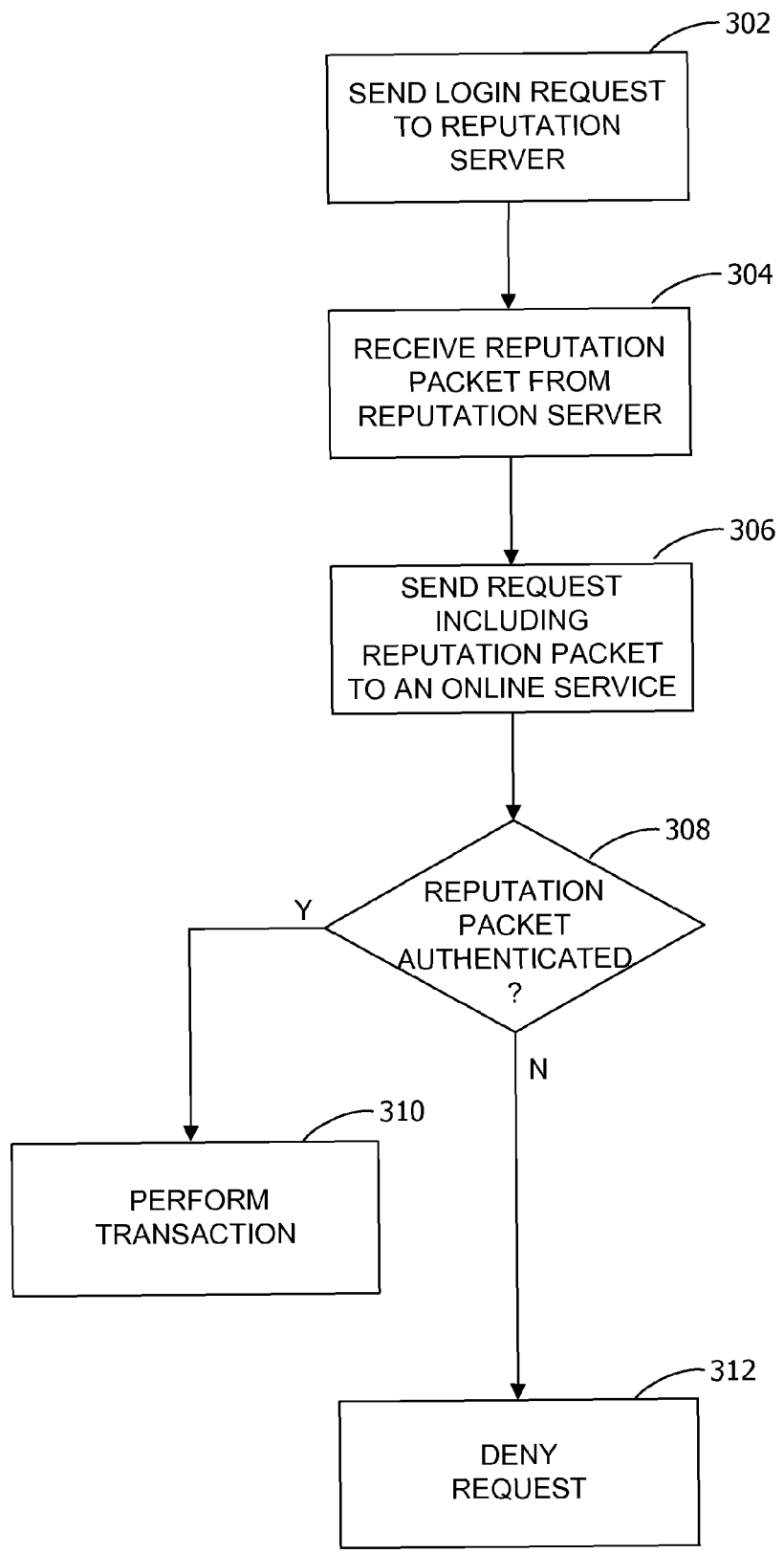
FIG. 3 is an exemplary flow diagram illustrating a method for authenticating a user based on a network-wide reputation packet for the user.

FIG. 3 is an exemplary flow diagram illustrating a method for authenticating a user 104 based on a network-wide reputation packet for the user 104. At 302, the user 104 sends a login request to a reputation server 102 of the network. The reputation server receives reputation feedback regarding the user's past interactions with the network. In response to the received request, the reputation server 102 generates a reputation packet.

At 304, the user 104 receives the reputation packet from the reputation server 102. The reputation packet includes a reputation score of the user 104 based on the reputation feedback. The reputation score indicates a probability that the user 104 will misuse the network.

At 306, the user 104 sends a request, including the reputation packet, to an online service (e.g., online service-1 112, online service-2 114, online service-3 116) of the network to perform a transaction. The online grants the user's request to perform the transaction based on the reputation score in the reputation packet.

In an embodiment, the online service (e.g., online service-1 112, online service-2 114, online service-3 116) authenticates the reputation packet via the reputation server 102 at 308. If the reputation packet is authenticated, the online service (e.g., online service-1 112, online service-2 114, online service-3 116) grants the user's request and performs the requested transaction at 310. If not, the user's request is denied at 312.

In another embodiment, the reputation packet includes one or more of the following: an identity of the user, a timestamp indicating the lifetime of the reputation packet, a suggested proof needed to grant the request, and information needed for the online service (e.g., online service-1 112, online service-2 114, online service-3 116) to provide feedback regarding the user's requested transaction.

And, in an alternative embodiment, if the user's reputation score is not sufficient to grant the user's request, the user 104 receives a request from the online service (e.g., online service-1 112, online service-2 114, online service-3 116) to perform a proof. The user 104 sends the requested proof to the online service. And, in response to the user 104 providing the requested proof, the online service grants the user's request.

In another embodiment, the online service (e.g., online service-1 112, online service-2 114, online service-3 116) provides reputation feedback to the reputation server 102 based on the proof received from the user 104. The reputation server 102 adjusts the user's reputation score based on the reputation feedback provided by the online service (e.g., online service-1 112, online service-2 114, online service-3 116).

Referring again to FIG. 1, FIG. 1 shows one example of a general purpose computing device in the form of a computer (e.g. reputation server 102). In one embodiment of the invention, a computer, such as the reputation server 102, is suitable for uses other than those illustrated and described herein. The computer has one or more processors or processing units and a system memory.

The computer (e.g. reputation server 102) typically has at least some form of computer readable media. Computer readable media, which include both volatile and nonvolatile media, removable and non-removable media, may be any available medium that may be accessed by computer. By way of example and not limitation, computer readable media comprise computer storage media and communication media.

Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The drives or other mass storage devices and their associated computer storage media discussed above, provide storage of computer readable instructions, data structures, program modules and other data for the computer (e.g. reputation server 102). In FIG. 1, for example, the reputation server 102 includes the feedback component 106, the reputation calculator, the reputation interface and the proof interface The computer (e.g. reputation server 102) may operate in a networked environment using logical connections to one or more remote computers, such as a remote computer hosting the online services (e.g., online service-1 112, online service-2 114, online service-3 116). The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

Generally, the data processors of computer (e.g. reputation server 102) are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer (e.g. reputation server 102), embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer (e.g. reputation server 102) executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computerized method of a processor of a computing device for authenticating a user based on a network-wide reputation for the user, said user having a user account associated therewith for accessing one or more online services of the network, said method comprising:

associating, by the processor, reputation feedback with the user account, said reputation feedback being based on one or more past transactions between the user and at least one of the online services of the network, said reputation feedback indicating whether or not any of the past transactions constitutes a misuse of the network;

calculating, by the processor, a reputation score for the user based on the reputation feedback associated with the user account for the past transactions, said reputation score indicating a likelihood of misuse of the network;

generating, by the processor, a reputation packet including the user's reputation score;

authenticating, by the processor, the reputation packet in response to a request from the user to perform a present transaction with at least one of the online services of the network, said request to perform the present transaction and said authenticated reputation packet being sent to the at least one of the online services;

receiving, by the processor, from the at least one of the online services, a reputation feedback based on a solved at least one of a computational proof and a human interactive proof, the proof being solved by the user in response to a request from the at least one of the online services determining the user's reputation score is not sufficient to grant the user's request to perform the present transaction; and adjusting, by the processor, the user's reputation score based on the received feedback.

2. The computerized method of claim 1, wherein the user's reputation score is negatively impacted when the user does not provide the requested solved proofs.

3. The computerized method of claim 1, wherein calculating the user's reputation score comprises negatively impacting the reputation score when at least one of the past transactions includes one or more of the following: SPAM, spyware, a virus, copyrighted material, a phishing attack, content prohibited by a user agreement, and pornography.

4. The computerized method of claim 1, wherein the user's reputation score is calculated based on one or more of the following reputation feedback metrics: a number of times the user has completed a transaction with the one or more online services, a number of other network users who have interacted with content generated by the user; a number of transactions the user has performed involving other network users, a number of complaints the user has received from other network users of the one or more online services, a number of times the user's content has been viewed by a network moderator or other highly trusted network user, a number of times the user had content removed because of an abuse report, a number of days since the user's user account was created, a number of unique days the user has been active on the network, an amount of traffic over the past 24 hours divided by the amount of traffic generated by user in an average 24 hour period, an amount of money the user has spent in the network, an amount of proof the user has provided, and a safety status of a client machine the user uses to access the network.

5. The computerized method of claim 1, wherein said processor is further configured for generating the reputation packet in response to the user's request to perform the present transaction, wherein the request and the reputation packet are forwarded to the online service associated with the request, said online service granting the request of the user based on the reputation packet.

6. The computerized method of claim 5, wherein said processor is further configured for making the reputation packet available to an external service in a request from the user to perform a transaction with the external service, said external service being an online service outside the network, said external service receiving and responsive to the reputation packet for granting or denying the request based at least in part on the user's reputation score.

7. The computerized method of claim 5, wherein the reputation packet includes one or more of the following: an identity of the user, a timestamp indicating the lifetime of the reputation packet, a suggested proof needed to grant the request, and information needed for the online service to provide reputation feedback regarding the user's present transaction.

8. The computerized method of claim 1, wherein the request is granted access based on the reputation score of the user and the likelihood that the present transaction is not an abuse of the network.

9. The computerized method of claim 1, wherein said processor is further configured for calculating the reputation score for the user based on reputation feedback received from a trusted service which does not belong to the network.

10. The computerized method of claim 1, wherein the calculated reputation score that indicates the acceptable likelihood for granting the user's request to perform the present transaction differs as a function of one or more of the following: a type of transaction, a type of online service, a time of the request, and a number of past transactions.

11. The computerized method of claim 1, wherein the online services include one or more of the following: a social networking service, an email service, a chat service, a photo sharing service, a file storage and sharing service, a shopping service, a search service, a map viewing service, and an instant message service.

12. The computerized method of claim 1, wherein the past and present transactions include one or more of the following: sending an email, sending an instant message, sending message in a chat room, saving a file, accessing a file, purchasing a product or service from a shopping service, searching the Internet, searching a web space, searching for directions, searching for an address, posting a message to a blog, posting audio to a blog, posting video to a blog, and positing a comment on a blog.

13. A method for authenticating a user based on a network-wide reputation for the user, comprising:
sending a login request to a reputation server of the network, said reputation server receiving reputation feedback regarding the user's past interactions with the network, said reputation server generating a reputation packet in response to the received login request;
receiving the reputation packet from the reputation server, said reputation packet including a reputation score of the user, said reputation score being based on the reputation feedback and said reputation score indicating a probability that the user will misuse the network;
sending a request to an online service of the network to perform a transaction, said request including the reputation packet, said reputation packet being authenticated via the reputation server before the online service grants the request;
receiving a request from the online service to solve a proof when the user's reputation score is not sufficient to grant the request to perform the transaction; and
sending the requested proof to the online service, the online service granting the request to perform the transaction based on the reputation score in the reputation packet and in response to the user providing the solved proof, the online service further providing reputation feedback to the reputation server based on the proof received from the user, and the reputation server adjusting the user's reputation score based on the provided reputation feedback.

14. The method of 13, wherein the reputation packet includes one or more of the following: an identity of the user, a timestamp indicating the lifetime of the reputation packet, a suggested proof needed to grant the request, and information needed for the online service to provide feedback regarding the user's requested transaction.

15. A system for calculating a reputation score of a user of a network, said network including one or more online services, said system having a memory area storing a plurality of computer-executable components, said components comprising:
a feedback component for receiving reputation feedback regarding one or more transactions by the user with at least one of the online services, said feedback indicating whether any of the user's transactions with the online services constitutes a misuse of the network;
a reputation calculator for calculating the reputation score of the user based on the reputation feedback, said reputation score indicating a probability that a subsequent transaction by the user is a misuse of the network;
a reputation interface for receiving requests from one or more of the online services for the reputation score of the user and for sending the reputation score of the user to the requesting online service; and
a proof interface for requesting the user to perform a proof when the user's reputation score is not sufficient to grant a request from the user and for receiving the requested proof from the user, the requested proof being sent to the online service, the online service granting the user's request in response to the proof, the online service further providing reputation feedback to the feedback component based on the received proof, and the reputation calculator adjusting the user's reputation score based on the provided reputation feedback.

* * * * *